United States Patent
Okada

(10) Patent No.: US 8,794,199 B2
(45) Date of Patent: Aug. 5, 2014

(54) SPARK IGNITION TYPE INTERNAL COMBUSTION ENGINE

(75) Inventor: Yoshihiro Okada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 59 days.

(21) Appl. No.: 13/132,204

(22) PCT Filed: May 1, 2009

(86) PCT No.: PCT/JP2009/058869
§ 371 (c)(1),
(2), (4) Date: Jun. 1, 2011

(87) PCT Pub. No.: WO2010/125696
PCT Pub. Date: Nov. 4, 2010

(65) Prior Publication Data
US 2012/0048241 A1    Mar. 1, 2012

(51) Int. Cl.
*F02B 75/04*    (2006.01)

(52) U.S. Cl.
USPC .... 123/48 C; 123/48 A; 123/48 B; 123/78 R; 123/78 A

(58) Field of Classification Search
CPC ........... F02M 25/0752; F02M 25/0749; F02B 19/14; F02B 1/12; F02D 13/0203; F02D 13/0215; F02D 13/0226; F02D 13/0249; F02D 13/0261
USPC ....... 123/48 C, 48 A, 48 B, 48 R, 48 D, 78 C, 123/78 R, 78 A, 78 B
See application file for complete search history.

(56) References Cited

U.S. PATENT DOCUMENTS

| 6,286,482 | B1 * | 9/2001 | Flynn et al. .................... 123/435 |
| 6,332,448 | B1 | 12/2001 | Ilyama et al. |
| 6,915,776 | B2 * | 7/2005 | zur Loye et al. .............. 123/304 |
| 2003/0106542 | A1 * | 6/2003 | Aoyama et al. .......... 123/568.14 |
| 2007/0215126 | A1 * | 9/2007 | Shiraishi et al. ......... 123/568.14 |
| 2009/0187329 | A1 | 7/2009 | Akihisa et al. |
| 2010/0192917 | A1 * | 8/2010 | Akihisa et al. ............. 123/48 C |

FOREIGN PATENT DOCUMENTS

| EP | 1 318 286 A2 | 6/2003 |
| JP | A-2004-218522 | 8/2004 |
| JP | A-2005-147103 | 6/2005 |
| JP | A-2007-9925 | 1/2007 |
| JP | A-2007-303423 | 11/2007 |
| WO | WO 2009/007835 A2 | 1/2009 |

OTHER PUBLICATIONS

International Search Report mailed Aug. 11, 2009 issued in International Patent Application No. PCT/JP2009/058869 (with translation).

* cited by examiner

*Primary Examiner* — Noah Kamen
*Assistant Examiner* — Long T Tran
(74) *Attorney, Agent, or Firm* — Oliff PLC

(57) ABSTRACT

A spark ignition-type internal combustion engine of the present invention is provided with a variable compression ratio mechanism able to change a mechanical compression ratio, a variable valve timing mechanism able to control a closing timing of an intake valve, and an EGR mechanism feeding part of the exhaust gas through the EGR passage as EGR gas into a combustion chamber. In the spark ignition type internal combustion engine, at the time of engine low load operation, compared with at the time of engine high load operation, the mechanical compression ratio is made higher. The higher the EGR rate, the higher the actual compression ratio is made.

16 Claims, 11 Drawing Sheets

Fig.1
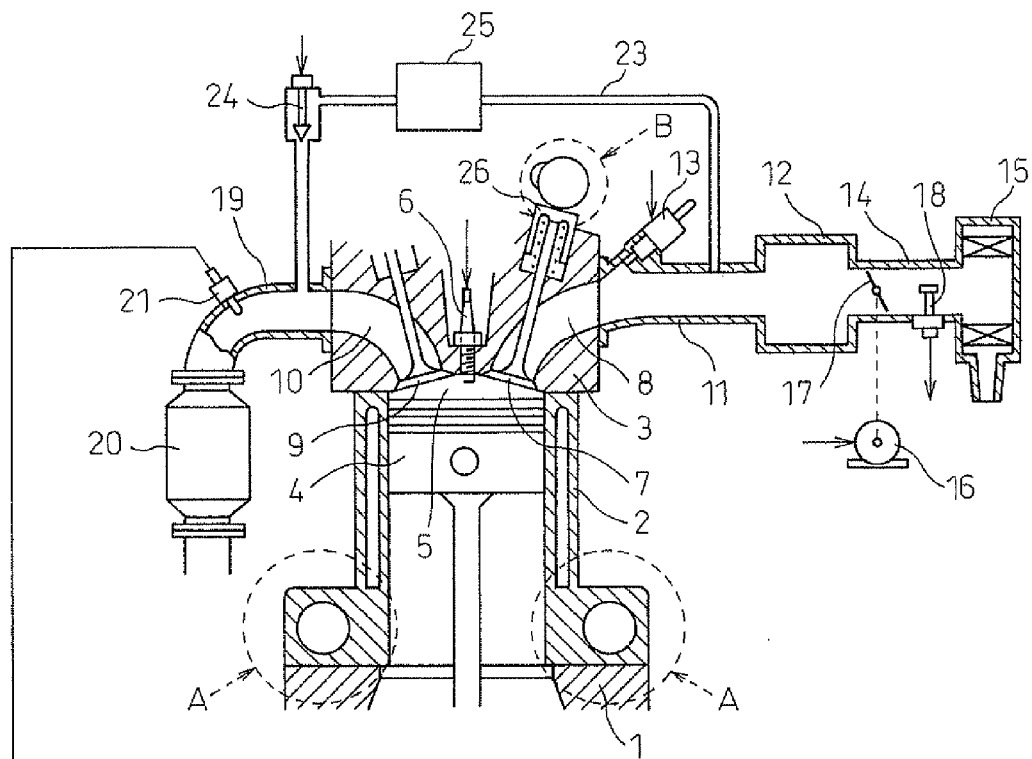
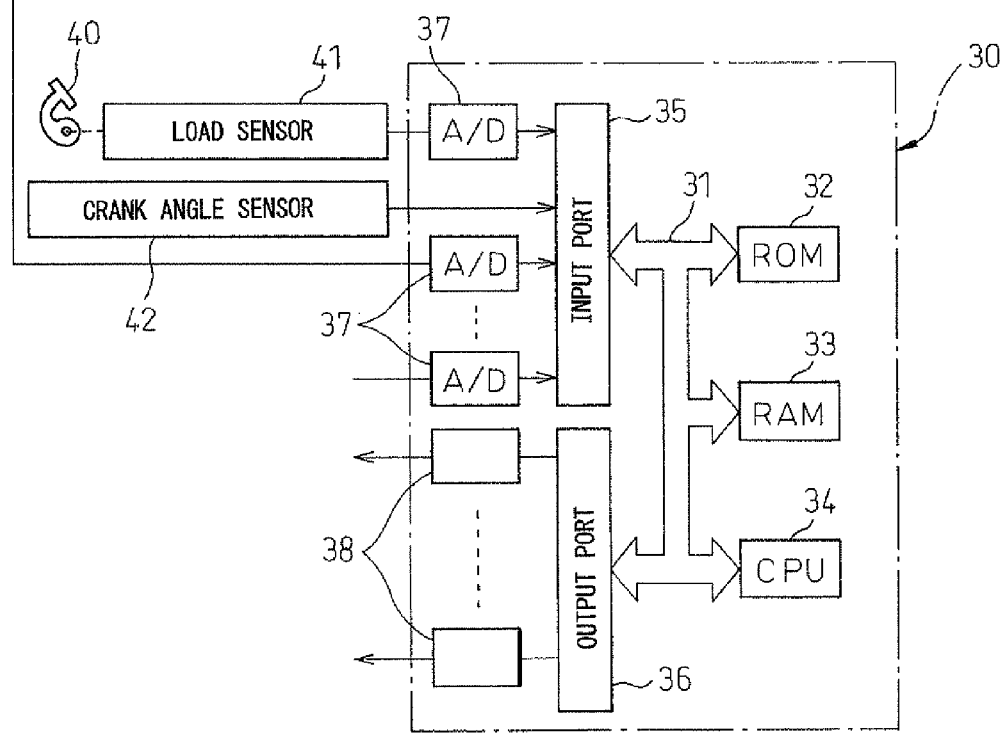

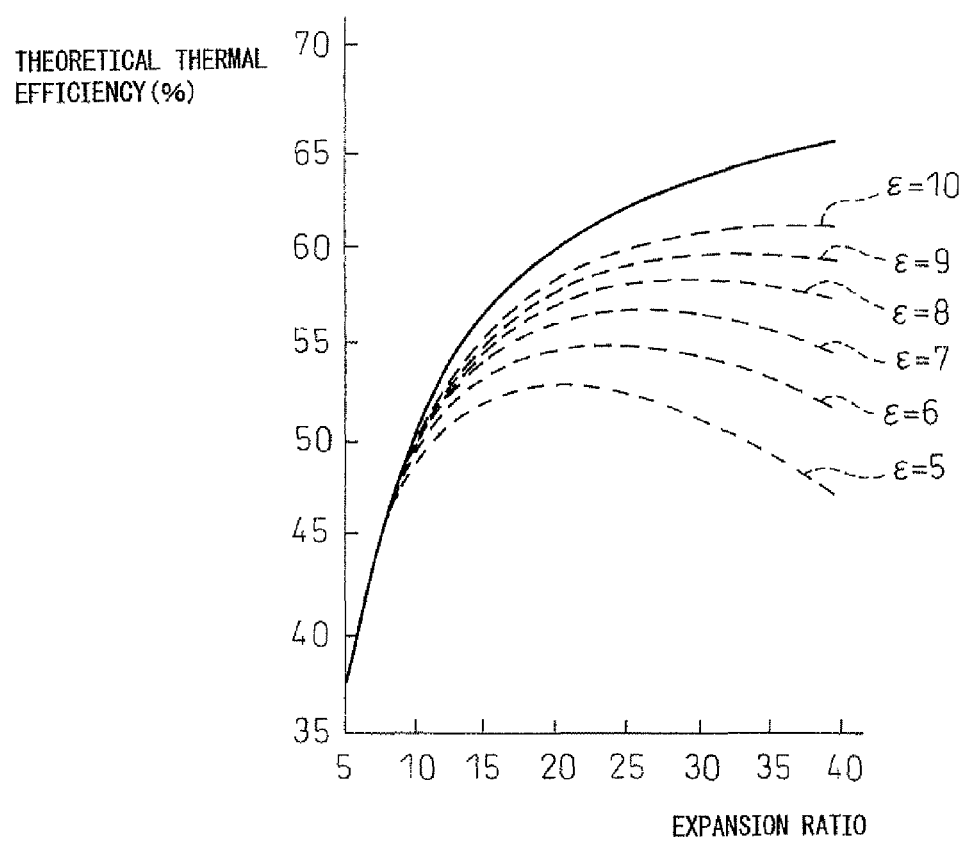

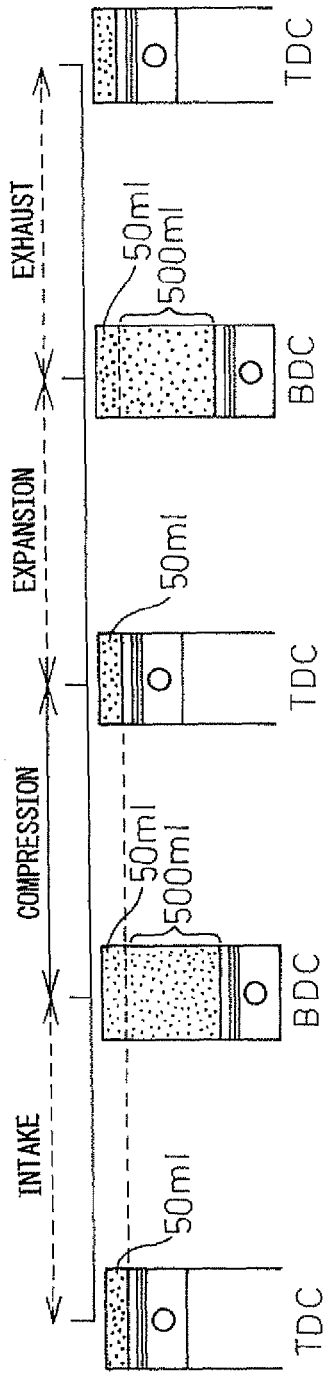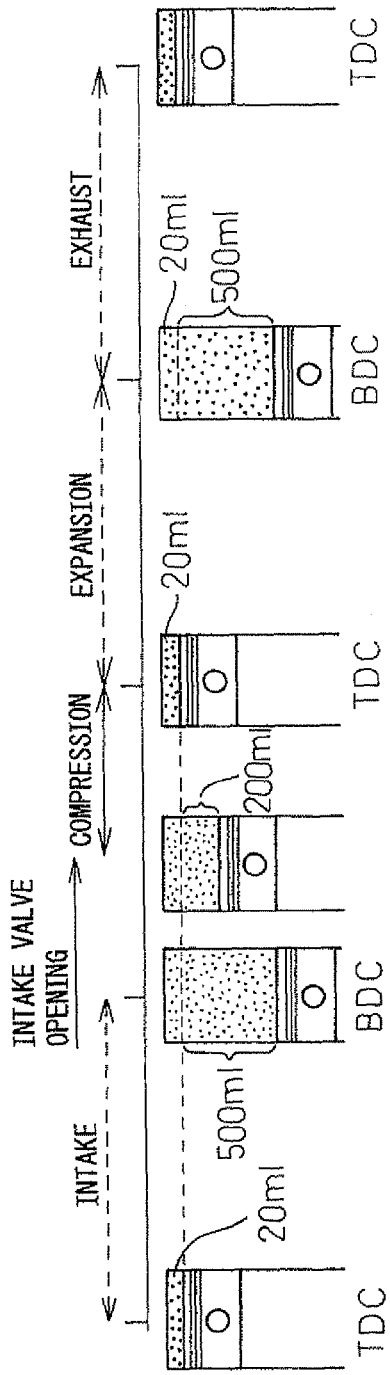

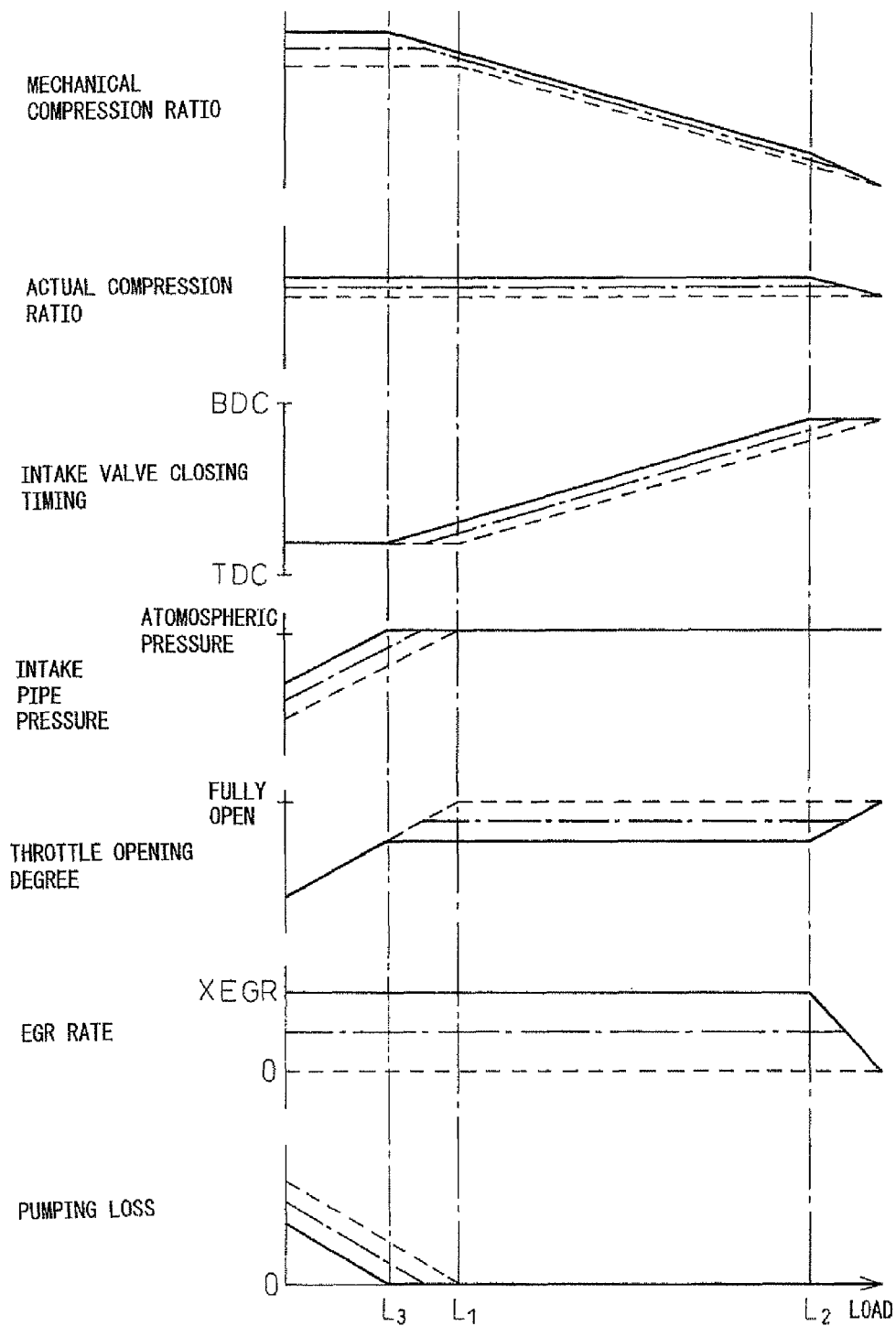

SPARK IGNITION TYPE INTERNAL COMBUSTION ENGINE

TECHNICAL FIELD

The present invention relates to a spark ignition type internal combustion engine.

BACKGROUND ART

Known in the art is a spark ignition type internal combustion engine provided with a variable compression ratio mechanism able to change a mechanical compression ratio and a variable valve timing mechanism able to control a closing timing of an intake valve, wherein the amount of intake air fed into a combustion chamber is mainly controlled by changing the closing timing of the intake valve, and the mechanical compression ratio at the time of engine low load operation is made higher compared with at the time of engine high load operation (for example, PLT 1).

In particular, since the expansion ratio has a greater effect on the theoretical heat efficiency than the actual compression ratio, in the spark ignition type internal combustion engine described in PLT 1, at the time of engine low load operation, the actual compression ratio is kept low while the mechanical compression ratio is made a high value, for example of 20 or more. Due to this, in the spark ignition type internal combustion engine described in PLT 1, the theoretical heat efficiency is made extremely high. Along with this, the fuel consumption is greatly improved.

CITATION LIST

Patent Literature

PLT 1: Japanese Patent Publication (A) No. 2007-303423

SUMMARY OF INVENTION

Technical Problem

In this regard, the spark ignition type internal combustion engine described in PLT 1 is not provided with an EGR mechanism for feeding part of the exhaust gas through an EGR passage as EGR gas to the inside of a combustion chamber again. Therefore, from the description of PLT 1, at the time of engine low load operation, it is unclear if the theoretical heat efficiency is raised when using an EGR mechanism for a spark ignition type internal combustion engine designed to keep the actual compression ratio low while raising the mechanical compression ratio.

Therefore, in view of the above problem, an object of the present invention is to provide a spark ignition type internal combustion engine provided with a variable compression ratio mechanism and a variable valve timing mechanism, wherein, at the time of engine low load operation, the mechanical compression ratio is raised compared with at the time of engine high load operation, and wherein an EGR mechanism, variable compression ratio mechanism, and variable valve timing mechanism are suitably controlled to raise the theoretical heat efficiency and improve the fuel consumption.

Solution to Problem

The present invention provides a control system of an internal combustion engine described in the claims as the solution to the above problem.

In a first aspect of the present invention, there is provided a spark ignition type internal combustion engine provided with a variable compression ratio mechanism able to change a mechanical compression ratio, a variable valve timing mechanism able to control a closing timing of an intake valve, and an EGR mechanism which feeds part of the exhaust gas through an EGR passage as EGR gas to the inside of a combustion chamber, wherein at the time of engine low load operation, a mechanical compression ratio is made higher compared with at the time of engine high load operation, wherein the higher the EGR rate, the higher an actual compression ratio is made.

Generally, the higher the EGR rate, the higher knocking resistance. For this reason, when the EGR rate is high, even if making the actual compression ratio high, knocking becomes harder to occur. According to the first aspect, the higher the EGR rate, the higher the actual compression ratio and, due to this, the higher the theoretical heat efficiency.

In a second aspect of the present invention, at the time of engine low load operation, the actual compression ratio is raised by increasing the mechanical compression ratio.

In a third aspect of the present invention, at the time when the engine load is higher than the engine load at which the closing timing of the intake valve reaches the retarded-side limit closing timing, and lower than the engine load at which the EGR rate reaches the set EGR rate, an actual compression ratio is increasing by advancing a closing timing of the intake valve.

In a fourth aspect of the present invention, at the time when the engine load is higher than the engine load at which the closing timing of the intake valve reaches the retarded-side limit closing timing, and lower than the engine load at which the EGR rate reaches the set EGR rate, the actual compression ratio is raised by increasing the mechanical compression ratio in addition to advancing the closing timing of the intake valve.

In a fifth aspect of the present invention, at the time when the engine load is higher than the engine load at which the closing timing of the intake valve reaches the retarded-side limit closing timing, the EGR mechanism is used to feed EGR gas into a combustion chamber.

In a sixth aspect of the present invention, at the time when the engine load is lower than the engine load at which the EGR rate reaches the set EGR rate, the closing timing of the intake valve is advanced up to an advanced-side limit closing timing along with the engine load becoming higher.

In a seventh aspect of the present invention, at the time when the engine load is lower than the engine load at which the EGR rate reaches the set EGR rate, in the region of a load lower than the engine load when the closing timing of the intake valve reaches the advanced-side limit closing timing, the amount of intake air fed into a combustion chamber is controlled by changing the closing timing of the intake valve.

In an eighth aspect of the present invention, at the time when the engine load is lower than the engine load at which the EGR rate reaches the set EGR rate, in the region of a load lower than the engine load when the closing timing of the intake valve reaches the advanced-side limit closing timing, the higher the engine load, the higher the EGR rate is made.

In a ninth aspect of the present invention, the time when the engine load is lower than the engine load at which the EGR rate reaches the set EGR rate, in the region of a load lower than the engine load when the closing timing of the intake valve reaches the advanced-side limit closing timing, the higher the engine load, the smaller the opening degree of the throttle valve is made.

In a 10th aspect of the present invention, at the time when the engine load is lower than the engine load at which the EGR rate reaches the set EGR rate, in the region of a load lower than the engine load when the closing timing of the intake valve reaches the advanced-side limit closing timing, the EGR rate is held substantially constant regardless of the engine load.

In an 11th aspect of the present invention, at the time when the engine load is lower than the engine load at which the EGR rate reaches the set EGR rate, in the region of a load lower than the engine load when the closing timing of the intake valve reaches the advanced-side limit closing timing, the opening degree of the throttle valve is held at a substantially constant opening degree more closed than fully open regardless of the engine load.

In a 12th aspect of the present invention, in the region of a load higher than the engine load when the closing timing of the intake valve reaches the advanced-side limit closing timing, the closing timing of the intake valve is held at the advanced-side limit closing timing.

In a 13th aspect of the present invention, in the region of a load higher than the engine load when the closing timing of the intake valve reaches the advanced-side limit closing timing, the opening degree of the throttle valve is made larger as the engine load becomes higher.

In a 14th aspect of the present invention, in the region of a load higher than the engine load when the closing timing of the intake valve reaches the advanced-side limit closing timing, the amount of intake air fed into a combustion chamber is controlled by changing the closing timing of the intake valve.

In a 15th aspect of the present invention, at the time of engine low load operation, the closing timing of the intake valve is retarded, as the engine load becomes lower, until a retarded-side limit closing timing enabling control of an amount of intake air fed into the combustion chamber.

In a 16th aspect of the present invention, in the region of a load lower than the engine load when the closing timing of the intake valve reaches the retarded side limit closing timing, the amount of intake air fed into a combustion chamber is controlled by changing the opening degree of the throttle valve.

In a 17th aspect of the present invention, at the time of engine low load operation, the mechanical compression ratio is made the maximum mechanical compression ratio.

In an 18th aspect of the present invention, at the time of engine low load operation, the expansion ratio is made 20 or more.

BRIEF DESCRIPTION OF DRAWINGS

FIG. 1 is an overall view of a spark ignition type internal combustion engine.

FIG. 7 is a view showing the relationship between the theoretical heat efficiency and the expansion ratio.

FIG. 8A and FIG. 8B are views for explaining an ordinary cycle and superhigh expansion ratio cycle.

FIG. 9 is a view showing changes in the mechanical compression ratio etc. according to the engine load.

DESCRIPTION OF EMBODIMENTS

Figure 2:
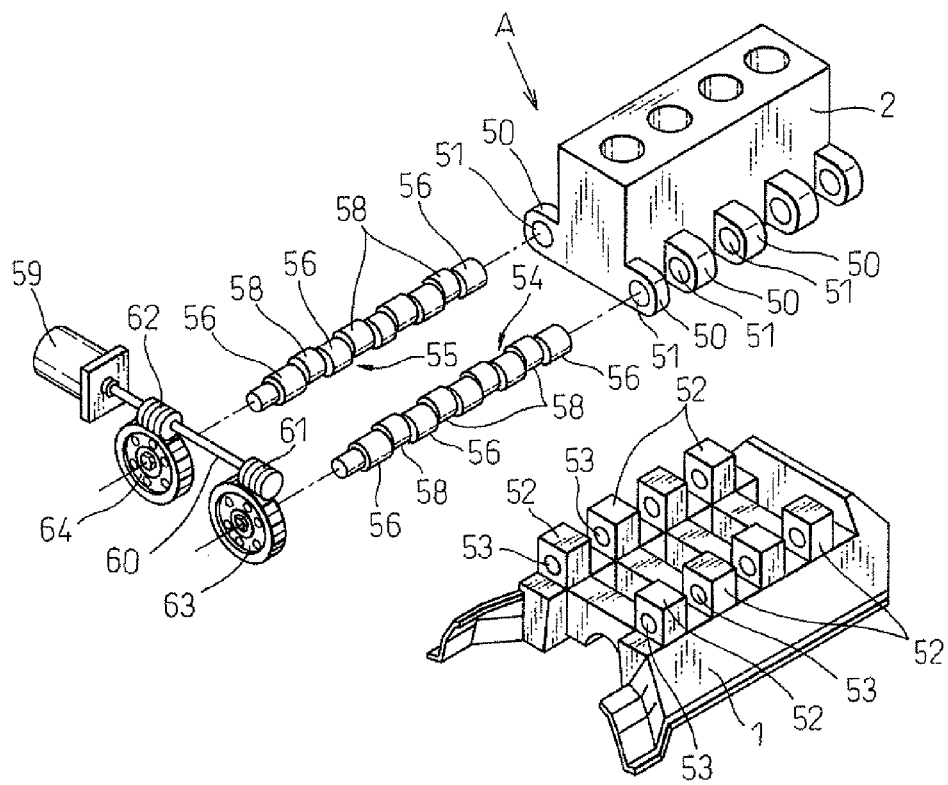
FIG. 2 is a disassembled perspective view of a variable compression ratio mechanism.

Below, an embodiment of the present invention will be explained in detail with reference to the drawings. Note that, in the following explanation, similar component elements are assigned the same reference numerals.

FIG. 1 shows a side cross-sectional view of a spark ignition-type internal combustion engine.

Referring to FIG. 1, 1 indicates a crank case, 2 a cylinder block, 3 a cylinder head, 4 a piston, 5 a combustion chamber, 6 a spark plug arranged at the center of a top surface of the combustion chamber 5, 7 an intake valve, 8 an intake port, 9 an exhaust valve, and 10 an exhaust port. The intake ports 8 are connected through intake branch pipes 11 to a surge tank 12. The intake branch pipes 11 have fuel injectors 13 arranged in them for injecting fuel toward corresponding intake ports 8. Note that, the fuel injectors 13 may also be arranged inside the combustion chambers 5 instead of being attached to the intake branch pipes 11.

The surge tank 12 is connected through an intake duct 14 to an air cleaner 15. In the intake duct 14, a throttle valve 17 driven by an actuator 16 and an intake air detector 18 using for example a hot wire are arranged. On the other hand, the exhaust port 10 is connected through an exhaust manifold 19 to a catalytic converter 20 in which for example a three-way catalyst is built in. Inside the exhaust manifold 19, an air-fuel ratio sensor 21 is arranged. Note that, in the following explanation, the part of the intake duct 14 downstream of the throttle valve 17, surge tank 12, intake branch pipe 11, and intake port 8 are referred to all together as the "intake pipe".

The exhaust manifold 19 and the intake branch pipes 11 (or the surge tank 12 or intake port 8) are connected with each other through EGR passage 23 for an exhaust gas recirculation (below, referred to as "EGR gas"). Inside this EGR passage 23, an EGR control valve 24 is arranged. Further, around the EGR passage 23, an EGR cooling device 25 for cooling the EGR gas flowing through the inside of the EGR passage 23 is arranged. In the internal combustion engine shown in FIG. 1, engine cooling water is led into the EGR cooling device 25. The engine cooling water is used to cool the EGR gas. Note that, in the following explanation, the EGR passage 23, EGR control valve 24, and EGR cooling device 25 are referred to together as the "EGR mechanism".

On the other hand, in the embodiment shown in FIG. 1, at a connecting part of the crank case 1 and cylinder block 2, a variable compression ratio mechanism A is provided which can change a relative position of the crank case 1 and cylinder block 2 in the cylinder axial direction so as to change the volume of a combustion chamber 5 when a piston 4 is positioned at compression top dead center. Furthermore, a variable valve timing mechanism B is provided which can change a closing timing of an intake valve 7.

An electronic control unit 30 is comprised of a digital computer which is provided with components connected with each other by a bidirectional bus 31 such as a ROM (read only memory) 32, RAM (random access memory) 33, CPU (microprocessor) 34, input port 35, and output port 36. An output signal of the intake air detector 18 and an output signal of the air-fuel ratio sensor 21 are input through respectively corresponding AD converters 37 to the input port 35. Further, an accelerator pedal 40 is connected to a load sensor 41 which generates an output voltage proportional to the amount of depression of the accelerator pedal 40. The output voltage of the load sensor 41 is input through a corresponding AD converter 37 to the input port 35. Furthermore, the input port 35 has a crank angle sensor 42 which generates an output pulse every time the crankshaft rotates by for example 10°. On the other hand, the output port 36 is connected through corresponding drive circuits 38 to the spark plugs 6, fuel injectors 13, throttle valve drive-use actuator 16, EGR control valve 24, variable compression ratio mechanism A, and variable valve timing mechanism B.

Figures 3A, 3B:
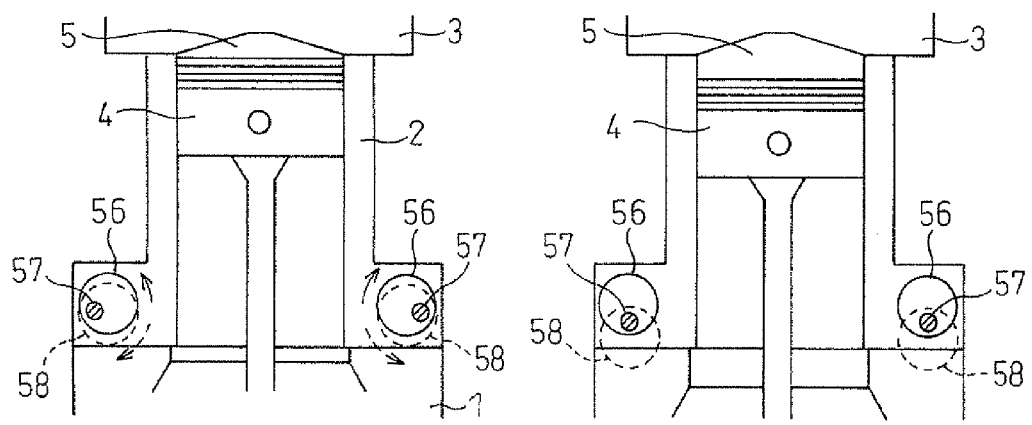
FIG. 3A and FIG. 3B are side cross-sectional views of schematically illustrated internal combustion engine.

FIG. 2 is a disassembled perspective view of the variable compression ratio mechanism A shown in FIG. 1, while FIG. 3A and FIG. 3B are side cross-sectional views of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, eccentric shafts 57 extend between the circular cams 56, and the eccentric shafts 57 are arranged eccentrically with respect to the axes of rotation of the cam shafts 54, 55 as shown by the hatching in FIG. 3A and FIG. 3B. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions from each other as shown by the solid line arrows in FIG. 3A from the state shown in FIG. 3A, the eccentric shafts 57 move toward the bottom center, so the circular cams 58 rotate in the opposite directions from the circular cams 56 in the cam insertion holes 53 as shown by the broken line arrows in FIG. 3A. When the eccentric shafts 57 move toward the bottom center as shown in FIG. 3B, the centers of the circular cams 58 move to below the eccentric shafts 57.

As will be understood from a comparison of FIG. 3A and FIG. 3B, the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 is moved farther away from the crank case 1, the volume of the combustion chamber 5 when the piston 4 is positioned at compression top dead center increases, therefore by making the cam shafts 54, 55 rotate, the volume of the combustion chamber 5 when the piston 4 is positioned at compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55, respectively. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
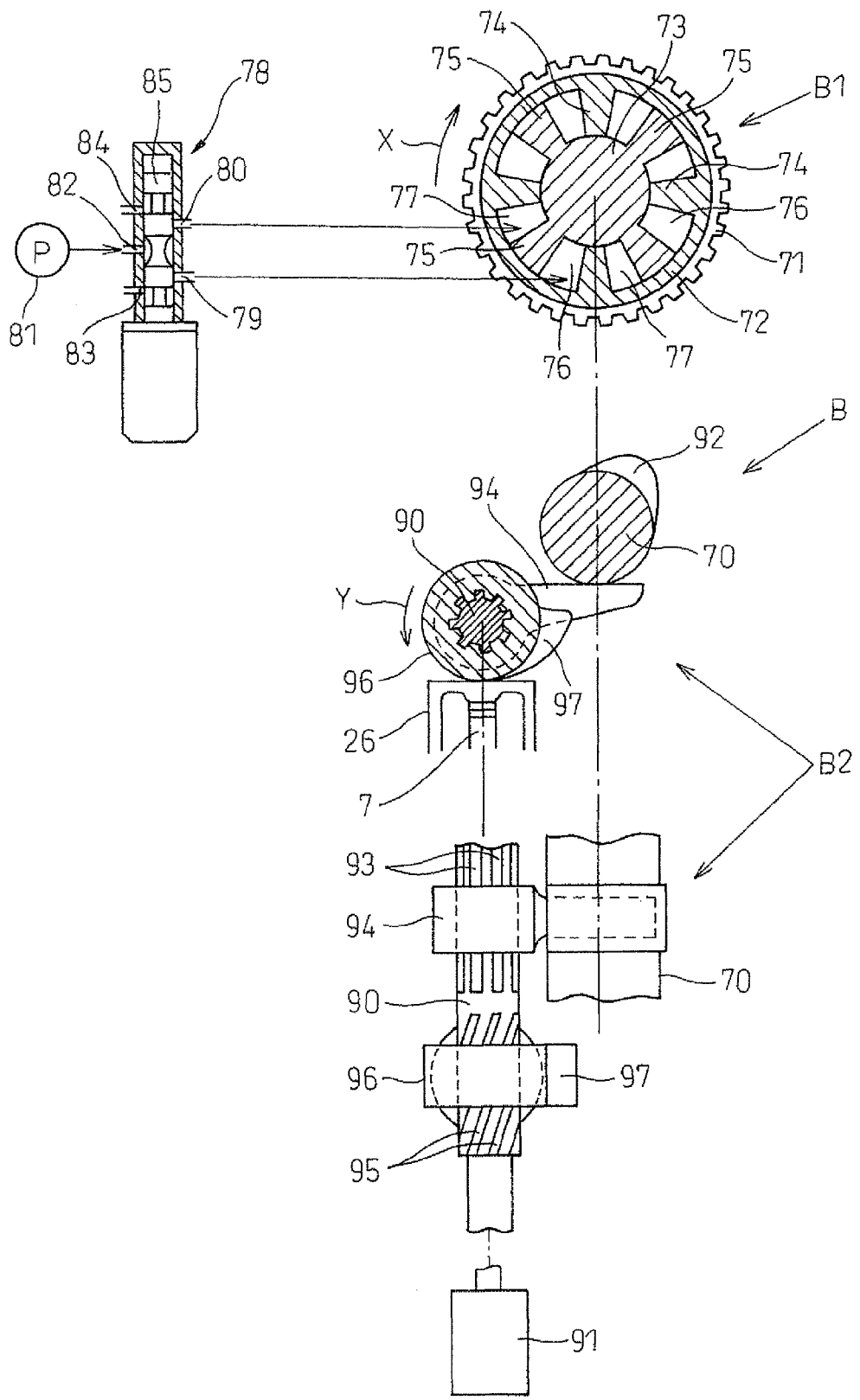
FIG. 4 is a view showing a variable valve timing mechanism.

On the other hand, FIG. 4 shows a variable valve timing mechanism B attached to the cam shaft 70 for driving the intake valve 7 in FIG. 1. As shown in FIG. 4, the variable valve timing mechanism B is comprised of a cam phase changer B1 attached to one end of the cam shaft 70 and changing the phase of the cam of the cam shaft 70 and a cam working angle changer B2 arranged between the cam shaft 70 and the valve lifter 26 of the intake valve 7 and changing the working angle of the cams of the cam shaft 70 to different working angles for transmission to the intake valve 7. Note that FIG. 4 is a side sectional view and plan view of the cam working angle changer B2. First, explaining the cam phase changer B1 of the variable valve timing mechanism B, this cam phase changer B1 is provided with a timing pulley 71 made to rotate by an engine crank shaft through a timing belt in the arrow direction, a cylindrical housing 72 rotating together with the timing pulley 71, a shaft 73 able to rotate together with a cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with advancing use hydraulic chambers 76 and retarding use hydraulic chambers 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84, and a spool valve 85 for controlling connection and disconnection of the ports 79, 80, 82, 83, 84.

To advance the phase of the cams of the cam shaft 70, in FIG. 4, the spool valve 85 is made to move to downward, working oil fed from the feed port 82 is fed through the hydraulic port 79 to the advancing use hydraulic chambers 76, and working oil in the retarding use hydraulic chambers 77 is drained from the drain port 84. At this time, the shaft 73 is made to rotate relative to the cylindrical housing 72 in the arrow X-direction.

As opposed to this, to retard the phase of the cam of the cam shaft 70, in FIG. 4, the spool valve 85 is made to move upward, working oil fed from the feed port 82 is fed through the hydraulic port 80 to the retarding use hydraulic chambers 77, and working oil in the advancing use hydraulic chambers 76 is drained from the drain port 83. At this time, the shaft 73 is made to rotate relative to the cylindrical housing 72 in the direction opposite to the arrows X.

Figure 5A:
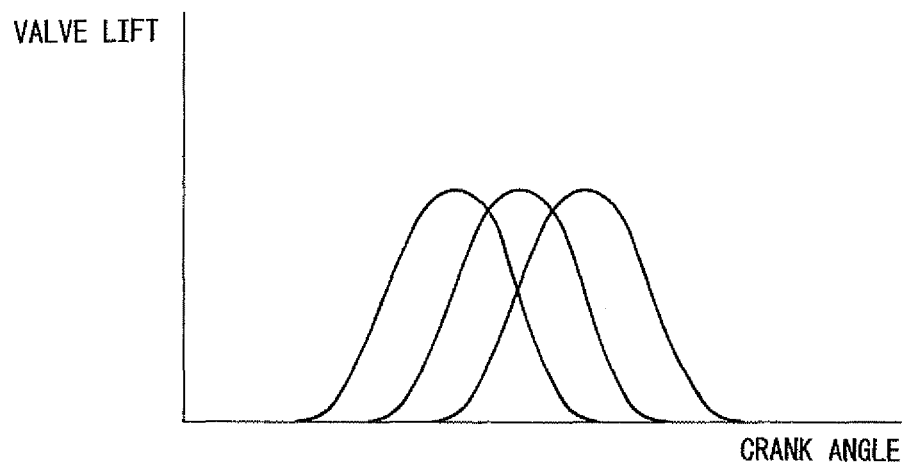
FIG. 5A and FIG. 5B are views showing the amounts of lift of an intake valve and an exhaust valve.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the cam phase changer B1 so as to advance or retard the phase of the cam of the cam shaft 70 by exactly the desired amount as shown in FIG. 5A. That is, the cam phase changer B1 can freely advance or retard the opening timing of the intake valve 7.

Next, explaining the cam working angle changer B2 of the intake variable valve timing mechanism B, this cam working angle changer B2 is provided with a control rod 90 arranged in parallel with the cam shaft 70 and made to move by an actuator 91 in the axial direction, an intermediate cam 94 engaging with a cam 92 of the cam shaft 70 and slidingly fitting with a spline 93 formed on the control rod 90 and extending in the axial direction, and a pivoting cam 96 engaging with a valve lifter 26 for driving the intake valve 7 and slidingly fitting with a spline 95 extending in a spiral formed on the control rod 90. The pivoting cam 96 is formed with a cam 97.

When the cam shaft 70 rotates, the cam 92 causes the intermediate cam 94 to pivot by exactly a constant angle at all times. At this time, the pivoting cam 96 is also made to pivot by exactly a constant angle. On the other hand, the intermediate cam 94 and pivoting cam 96 are supported not movably in the axial direction of the control rod 90, therefore when the control rod 90 is made to move by the actuator 91 in the axial direction, the pivoting cam 96 is made to rotate relative to the intermediate cam 94.

Figure 5B:
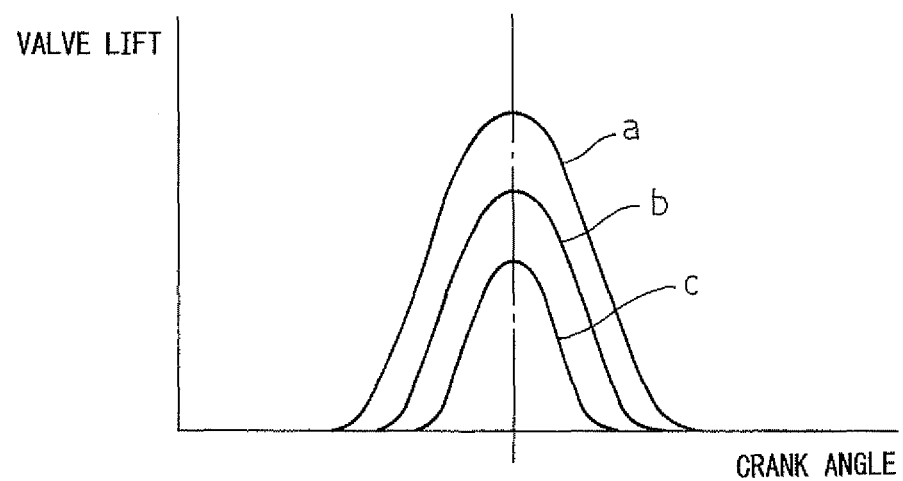

In the case where the cam 97 of the pivoting cam 96 starts to engage with the valve lifter 26 when the cam 92 of the cam shaft 70 starts to engage with the intermediate cam 94 due to the relative rotational positional relationship between the intermediate cam 94 and pivoting cam 96, as shown by a in FIG. 5B, the opening time period and amount of lift of the intake valve 7 become maximum. As opposed to this, when the actuator 91 is used to make the pivoting cam 96 rotate relative to the intermediate cam 94 in the arrow Y-direction of FIG. 4, the cam 92 of the cam shaft 70 engages with the intermediate cam 94, then after a while the cam 97 of the pivoting cam 96 engages with the valve lifter 26. In this case, as shown by b in FIG. 5B, the opening time period and amount of lift of the intake valve 7 become smaller than a.

When the pivoting cam 96 is made to rotate relative to the intermediate cam 94 in the arrow Y-direction of FIG. 4, as shown by c in FIG. 5B, the opening time period and amount of lift of the intake valve 7 become further smaller. That is, by using the actuator 91 to change the relative rotational position of the intermediate cam 94 and pivoting cam 96, the opening time period (working angle) of the intake valve 7 can be freely changed. However, in this case, the amount of the lift of the intake valve 7 becomes smaller the shorter the opening time period of the intake valve 7.

The cam phase changer B1 can be used to freely change the opening timing of the intake valve 7 and the cam working angle changer B2 can be used to freely change the opening time period of the intake valve 7 in this way, so both the cam phase changer B1 and cam working angle changer B2, that is, the variable valve timing mechanism B, may be used to freely change the opening timing and opening time period of the intake valve 7, that is, the opening timing and closing timing of the intake valve 7.

Note that the variable valve timing mechanism B shown in FIG. 1 and FIG. 4 show an example. It is also possible to use various types of variable valve timing mechanisms other than the example shown in FIG. 1 and FIG. 4. In particular, in this embodiment according to the present invention, so long as a closing timing mechanism which can change the closing timing of an intake valve 7, any type of mechanism may be used. Further, for the exhaust valve 9 as well, a variable valve timing mechanism similar to the variable valve timing mechanism B of the intake valve 7 may be provided.

Figure 6A:
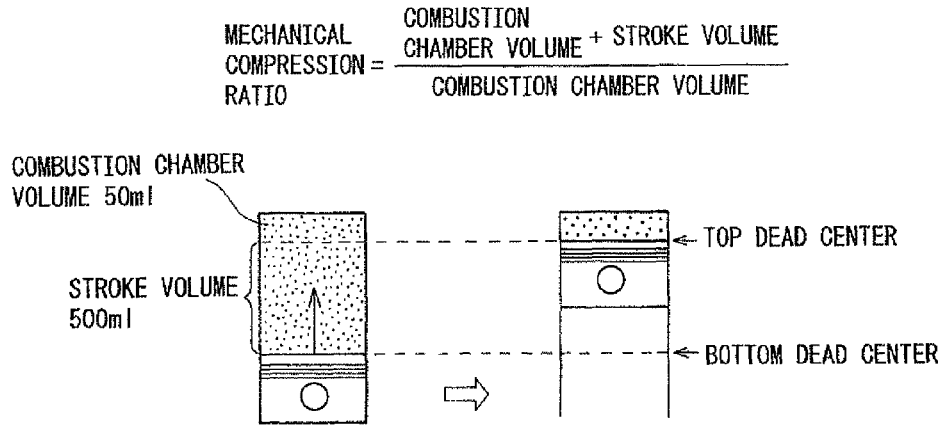
FIG. 6A to FIG. 6C are views for explaining a mechanical compression ratio, actual compression ratio, and expansion ratio.
Figure 6B:
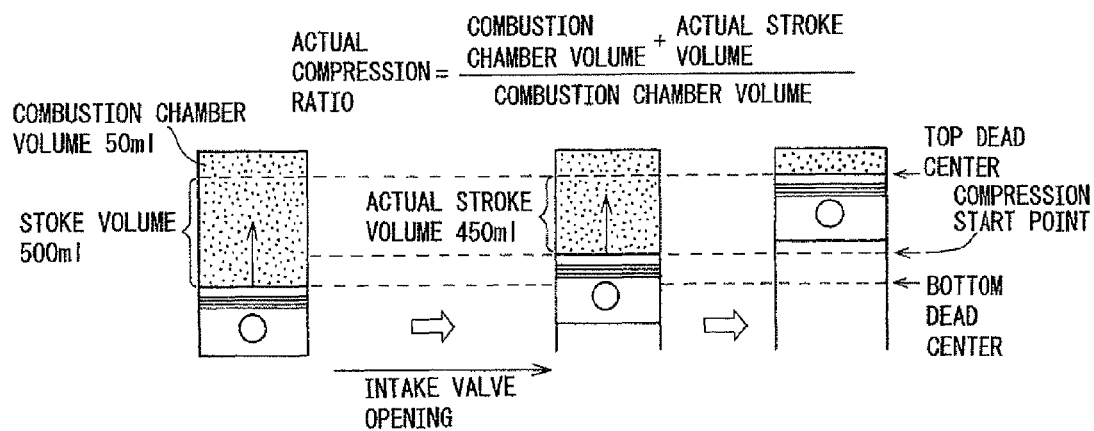
Figure 6C:
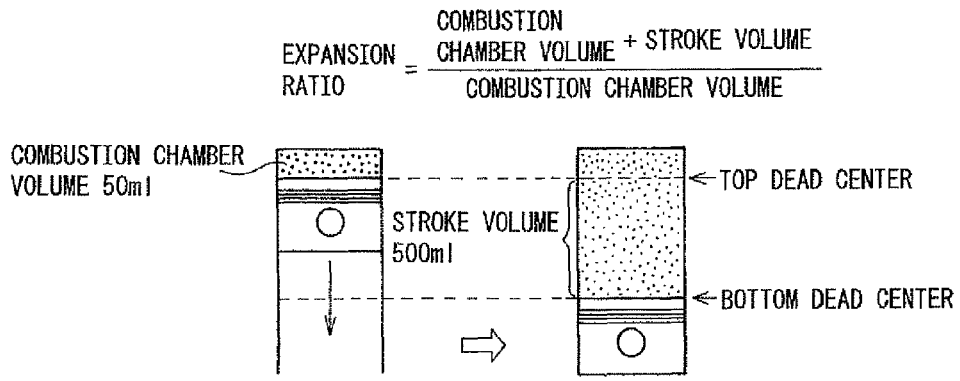

Next, the meaning of the terms used in the present application will be explained with reference to FIG. 6A to FIG. 6C. Note that FIG. 6A to FIG. 6C show for explanatory purposes an engine with a volume of the combustion chambers of 50 ml and a stroke volume of the piston of 500 ml. In these FIG. 6A to FIG. 6C, the combustion chamber volume shows the volume of the combustion chamber when the piston is at compression top dead center.

FIG. 6A explains the mechanical compression ratio. The mechanical compression ratio is a value determined mechanically from the stroke volume of the piston at the time of a compression stroke and combustion chamber volume. This mechanical compression ratio is expressed by (combustion chamber volume+stroke volume)/combustion chamber volume. In the example shown in FIG. 6A, this mechanical compression ratio becomes (50 ml+500 ml)/50 ml=11.

FIG. 6B explains the actual compression ratio. This actual compression ratio is a value determined from the actual stroke volume of the piston from when the compression action is actually started to when the piston reaches top dead center and the combustion chamber volume. This actual compression ratio is expressed by (combustion chamber volume+actual stroke volume)/combustion chamber volume. That is, as shown in FIG. 6B, even if the piston starts to rise in the compression stroke, no compression action is performed while the intake valve is opened. The actual compression action is started after the intake valve closes. Therefore, the actual compression ratio is expressed as follows using the actual stroke volume. In the example shown in FIG. 6B, the actual compression ratio becomes (50 ml+450 ml)/50 ml=10.

FIG. 6C explains the expansion ratio. The expansion ratio is a value determined from the stroke volume of the piston at the time of an expansion stroke and value determined from the combustion chamber volume. This expansion ratio is expressed by the (combustion chamber volume+stroke volume)/combustion chamber volume. In the example shown in FIG. 6C, this expansion ratio becomes (50 ml+500 ml)/50 ml=11.

Next, the most basic features of the present invention will be explained with reference to FIG. 7, FIG. 8A, and FIG. 8B. Note that FIG. 7 shows the relationship between the theoretical heat efficiency and the expansion ratio, while FIG. 8A and FIG. 8B show a comparison between the ordinary cycle and superhigh expansion ratio cycle used selectively in accordance with the load in the present invention.

FIG. 8A shows the ordinary cycle wherein the intake valve closes near the bottom dead center and the compression action by the piston is started from near substantially compression bottom dead center. In the example shown in this FIG. 8A as well, in the same way as the examples shown in FIG. 6A to FIG. 6C, the combustion chamber volume is made 50 ml, and the stroke volume of the piston is made 500 ml. As will be understood from FIG. 8A, in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

The solid line in FIG. 7 shows the change in the theoretical heat efficiency in the case where the actual compression ratio and expansion ratio are substantially equal, that is, in the ordinary cycle. In this case, it is learned that the larger the expansion ratio, that is, the higher the actual compression ratio, the higher the theoretical heat efficiency. Therefore, in an ordinary cycle, to raise the theoretical heat efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical heat efficiency cannot be made sufficiently high.

On the other hand, under this situation, the inventors strictly differentiated between the mechanical compression ratio and actual compression ratio and studied the theoretical heat efficiency and as a result discovered that in the theoretical heat efficiency, the expansion ratio is dominant, and the theoretical heat efficiency is not affected much at all by the actual compression ratio. That is, if raising the actual compression ratio, the explosive force rises, but compression requires a large energy, accordingly even if raising the actual compression ratio, the theoretical heat efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical heat efficiency becomes. The broken line of c=10 in FIG. 7 shows the theoretical heat efficiency in the case of fixing the actual compression ratio at 10 and raising the expansion ratio in that state. In this way, it is learned that the amount of rise of the theoretical heat efficiency when raising the expansion ratio in the state where the actual compression ratio is maintained at a low value and the amount of rise of the theoretical heat efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical heat efficiency can be greatly raised. FIG. 8B shows an example of the case when using the variable compression ratio mechanism A and variable valve timing mechanism B to maintain the actual compression ratio at a low value and raise the expansion ratio.

Referring to FIG. 8B, in this example, the variable compression ratio mechanism A is used to lower the combustion chamber volume from 50 ml to 20 ml. On the other hand, the intake variable valve timing mechanism B is used to retard the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8A, as explained above, the actual compression ratio is about 11 and the expansion ratio is 11. Compared with this case, in the case shown in FIG. 8B, it is learned that only the expansion ratio is raised to 26. This will be called the "superhigh expansion ratio cycle" below.

As explained above, generally speaking, in an internal combustion engine, the lower the engine load, the worse the heat efficiency, therefore to improve the heat efficiency at the time of vehicle operation, that is, to improve the fuel efficiency, it becomes necessary to improve the heat efficiency at the time of engine low load operation. On the other hand, in the superhigh expansion ratio cycle shown in FIG. 8B, the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8B is set, while at the time of engine high load operation, the ordinary cycle shown in FIG. 8A is set. This is the basic feature of the present invention.

Next, the operational control as a whole will be explained with reference to FIG. 9.

FIG. 9 shows the changes in different parameters, such as the mechanical compression ratio, actual compression ratio, closing timing of the intake valve 7, pressure inside the intake pipe, opening degree of the throttle valve 17, and EGR rate, in accordance with the engine load at a certain engine speed. In particular, the solid lines in FIG. 9 show the changes of the parameters when using the EGR mechanism to feed EGR gas into a combustion chamber 5 (that is, when the EGR rate is high), while the broken lines in FIG. 9 show the changes in the parameters when not using the EGR mechanism to feed EGR gas into a combustion chamber 5 (that is, when the EGR rate is extremely low).

Note that, in the illustrated example, to enable the three-way catalyst in the catalytic converter 20 to simultaneously reduce the unburned hydrocarbons (unburned HC), carbon monoxide (CO), and nitrogen oxides ($NO_x$) in the exhaust gas, normally the average air-fuel ratio in a combustion chamber 5 is feedback controlled based on the output signal of the air-fuel ratio sensor 27 to the stoichiometric air-fuel ratio.

First, the operational control in the case, shown by the broken lines in FIG. 9, of not feeding EGR gas into a combustion chamber (that is, when the EGR rate is extremely low) will be explained.

In this embodiment of the present invention, as explained above, at the time of engine high load operation, the ordinary cycle shown in FIG. 8A is executed. Therefore, as shown by the broken lines in FIG. 9, at this time, the mechanical compression ratio is made low, so the expansion ratio is low and the closing timing of the intake valve 7 is advanced. Further, at this time, the intake air amount is large. At this time, the opening degree of the throttle valve 20 is held fully open or substantially fully open.

On the other hand, as shown by the broken lines in FIG. 9, if the engine load becomes low, along with this the closing timing of the intake valve 7 is retarded so as to reduce the intake air amount. Further, at this time, to enable the actual compression ratio to be held substantially constant, as shown by the broken lines in FIG. 9, the mechanical compression ratio is increased as the engine load becomes lower and, therefore, the mechanical compression ratio is increased as the engine load becomes lower. Note that, at this time as well, the throttle valve 27 is held in the fully open or substantially fully open state. Therefore, the amount of intake air fed into a combustion chamber 5 is controlled, without using the throttle valve 17, by changing the closing timing of the intake valve 7.

In this way, when the engine load becomes lower from the engine high load operating state, under a substantially constant actual compression ratio, the mechanical compression ratio is made to increase as the intake air amount decreases. That is, the volume of a combustion chamber 5 when the piston 4 reaches compression top dead center is decreased proportional to the reduction in the amount of intake air. Therefore, the volume of a combustion chamber 5 when the piston 4 reaches compression top dead center changes proportional to the amount of intake air. Note that, since, at this time, the air-fuel ratio in a combustion chamber 5 becomes the stoichiometric air-fuel ratio, the volume of a combustion chamber 5 when a piston reaches compression top dead center changes proportional to the amount of fuel.

If the engine load becomes further lower, the closing timing of the intake valve 7 is further retarded. If the engine load falls to $L_1$, the closing timing of the intake valve 7 becomes the retarded-side limit closing timing. This retarded-side limit closing timing is made the closing timing beyond which, if the closing timing of the intake valve 7 is retarded more, the amount of intake gas fed into a combustion chamber 5 can no longer be controlled by changing the closing timing of the intake valve 7. If the closing timing of the intake valve 7 reaches the retarded-side limit closing timing, in the region of a load lower than the engine load $L_1$ when the closing timing of the intake valve 7 reaches the retarded-side limit closing timing, the closing timing of the intake valve 7 is held at the retarded-side limit closing timing.

Further, in the example shown by the broken lines in FIG. 9, as the engine load becomes lower from the engine high load operating state, the mechanical compression ratio is made to increase. If the engine load falls down to the engine load $L_1$ where the closing timing of the intake valve 7 reaches the retarded-side limit closing timing, the mechanical compression ratio reaches a certain specific mechanical compression ratio (below, referred to as a "specific mechanical compression ratio").

In the region of a load lower than the engine load $L_1$ when the closing timing of the intake valve 7 reaches the retarded-side limit closing timing, the mechanical compression ratio is held at a specific mechanical compression ratio. This specific mechanical compression ratio is set so that the actual compression ratio in a region of a load lower than the engine load $L_1$ when the closing timing of the intake valve 7 reaches the retarded-side limit closing timing becomes substantially the same as the actual compression ratio in the region of a load higher than the engine load $L_1$ when the closing timing of the intake valve 7 reaches the retarded-side limit closing timing. For example, the actual compression ratio in the region of a load lower than the engine load $L_1$ is made within a range of about ±10 percent of the actual compression ratio in the region of a load higher than the engine load $L_1$, preferably within a range of ±5 percent.

On the other hand, if the closing timing of the intake valve 7 is held at the retarded-side limit closing timing, the change of the closing timing of the intake valve 7 can no longer be used to control the intake air amount. In the example shown by the broken lines in FIG. 9, at this time, that is, in the region of a load lower than the engine load $L_1$ when the closing timing of the intake valve 7 reaches the limit closing timing, the throttle valve 17 is used to control the amount of intake air fed into a combustion chamber 5. However, if using the throttle valve 17 to control the intake air amount, the pumping loss increases as shown by the broken lines in FIG. 9.

Note that, if using the throttle valve 17 to control the intake air amount, the pumping loss increases, so to prevent the occurrence of such pumping loss, in the region of a load lower than the engine load $L_1$ when the closing timing of the intake valve 7 reaches the limit closing timing, it is possible to hold the throttle valve 17 fully open or substantially fully open and in that state increase the air-fuel ratio the lower the engine load. At this time, it is preferable to arrange the fuel injector 13 in a combustion chamber 5 and perform layered combustion.

Further, as shown by the broken lines in FIG. 9, the actual compression ratio is held substantially constant regardless of the engine load. Specifically, the actual compression ratio at the time of engine low load operation is made a range of about ±10 percent of the actual compression ratio at the time when the engine load is lower than the engine load at which the EGR rate reaches the set EGR rate, preferably a range of ±5 percent. However, if the engine speed becomes higher, the air-fuel mixture in a combustion chamber 5 becomes disturbed, so knocking becomes harder to occur, so in this embodiment of the present invention, the higher the engine speed, the higher the actual compression ratio is made.

Furthermore, as explained above, in the superhigh expansion ratio cycle shown in FIG. 8B, the expansion ratio is made 26. The higher this expansion ratio, the better. However, the expansion ratio giving the maximum theoretical heat efficiency at the range of the actual compression ratio able to be practically used (E=5 or so to 13 or so) is 20 or more, so in the present invention, the variable compression ratio mechanism A is formed so that the expansion ratio becomes 20 or more.

Furthermore, in the example shown by the broken lines in FIG. 9, the mechanical compression ratio is made to continuously change in accordance with the engine load. However, the mechanical compression ratio can be changed in steps in accordance with the engine load.

Further, when making the closing timing of the intake valve 7 an advanced-side timing from intake bottom dead center, it is possible to advance the closing timing of the intake valve 7 as the engine load becomes lower so as to control the intake air amount. Therefore, if expressing the closing timing of the intake valve 7 all together, the closing timing of the intake valve 7 can be made to move in a direction away from compression bottom dead center until the limit closing timing in which the amount of intake air fed into a combustion chamber 5 can be controlled, as the engine load becomes lower.

Next, the operational control when feeding EGR gas into a combustion chamber 5 shown by the solid lines in FIG. 9 (that is, when the EGR rate is high) will be explained.

As shown by the solid lines in FIG. 9, even when feeding EGR gas into a combustion chamber 5, at the time of engine high load operation, the ordinary cycle shown in FIG. 8A is executed. Therefore, as shown by the solid lines in FIG. 9, when the engine load is highest, the mechanical compression ratio is made lower, so the expansion ratio is low. Further, the closing timing of the intake valve 7 is advanced until the advanced-side limit closing timing beyond which the closing timing cannot be advanced due to the mechanism of the variable valve timing mechanism B (for example, intake bottom dead center). Further, when the engine load is the highest, the amount of intake air is large, and at this time, the opening degree of the throttle valve 17 is made fully open or substantially fully open.

On the other hand, as shown by the solid lines in FIG. 9, if the engine load becomes lower from when the engine load is the highest, the opening degree of the throttle valve 17 is made smaller to reduce the amount of intake air along with this. Further, if the engine load becomes lower from when the engine load is the highest, along with the opening degree of the throttle valve 17 becoming smaller, the opening degree of the EGR control valve 24 is made larger and the ratio of the EGR gas in the air-fuel mixture fed into a combustion chamber 5 (below, referred to as the "EGR rate") is made higher until a certain specific EGR rate (below, referred to as "the set EGR rate") XEGR. If changing the viewpoint, to feed EGR gas into a combustion chamber 5 (that is, into an intake pipe), it is necessary to generate negative pressure in the intake pipe, so it can be said that the opening degree of the throttle valve 17 is made smaller for generating this negative pressure.

In this way, along with the opening degree of the throttle valve 17 becoming small, the EGR rate is made higher, so the pressure inside the intake pipe is held at the maximum pressure (that is, substantially atmospheric pressure) as it is. Therefore, the pumping loss accompanying reduction of the opening degree of the throttle valve 17 is made substantially zero.

Further, in the high load operating region of a load higher than the engine load $L_2$ when the EGR rate reaches the set EGR rate, the closing timing of the intake valve 7 is substantially held at the advanced-side limit closing timing. Therefore, in this region, the amount of intake air fed into a combustion chamber 5 is controlled by just changing the opening degree of the throttle valve 17.

Furthermore, in the high load operating region of a load higher than the engine load $L_2$ when the EGR rate reaches the set EGR rate, the actual compression ratio is made higher as the engine load becomes lower, that is, as the EGR rate becomes higher. This is because knocking resistance (resistance to knocking) becomes higher due to the EGR rate becoming higher, so even if increasing the actual compression ratio, knocking does not occur. Here, in the high load operating region of a load higher than the engine load $L_2$ when the EGR rate reaches the set EGR rate, the closing timing of the intake valve 7 is substantially held at the advanced-side limit closing timing, so the actual compression ratio is raised by raising the mechanical compression ratio. Therefore, the mechanical compression ratio is made higher as the engine load becomes lower as shown by the solid line of FIG. 9.

On the other hand, when in the load operating region of a load lower than the engine load $L_2$ when the EGR rate reaches the set EGR rate, the EGR rate is held at the set EGR rate. Further, after the EGR rate is held constant, to prevent knocking from occurring, the actual compression ratio is also held constant.

Further, when in the load operating region of a load lower than the engine load $L_2$ when the EGR rate reaches the set EGR rate, the EGR rate is held at the set EGR rate. For this reason, even if making the opening degree of the throttle valve 17 smaller than this, it is not possible to increase the feed of the EGR gas so as to maintain the pressure inside the intake pipe at the atmospheric pressure. As a result, pumping loss ends up occurring. Therefore, when in the load operating region of a load lower than the engine load $L_2$ when the EGR rate reaches the set EGR rate, the opening degree of the throttle valve 17 is held at a certain constant opening degree closed more than fully open. Due to this, in this region as well, the pressure inside the intake pipe is held at substantially atmospheric pressure and the pumping loss is made substantially zero.

On the other hand, when in the load operating region of a load lower than the engine load $L_2$ when the EGR rate reaches the set EGR rate, if the engine load becomes lower, the closing timing of the intake valve 7 is retarded for reducing the amount of intake air along with this. As explained above, when in the load operating region of a load lower than the engine load $L_2$ when the EGR rate reaches the set EGR rate, the opening degree of the throttle valve 17 and EGR rate are maintained constant, so the amount of intake air fed into a combustion chamber 5 is controlled, without using the throttle valve 17 and EGR control valve 24, by changing the closing timing of the intake valve 7.

Furthermore, when in the load operating region of a load lower than the engine load $L_2$ when the EGR rate reaches the set EGR rate, the mechanical compression ratio is made to increase as the engine load becomes lower, i.e., as the closing timing of the intake valve 7 is retarded, the actual compression ratio becomes substantially constant.

Note that, the closing timing of the intake valve 7 is advanced as the engine load becomes higher when in the load operating region of a load lower than the engine load $L_2$, and reaches the advanced-side limit closing timing at the engine load $L_2$. Therefore, the engine load $L_2$ can also be called "the engine load when the closing timing of the intake valve 7 reaches the advance side limit closing timing".

If the engine load becomes further lower, the closing timing of the intake valve 7 is further retarded. If the engine load falls to $L_3$, the closing timing of the intake valve 7 becomes the retarded-side limit closing timing. Here, the engine load $L_3$ where the closing timing of the intake valve 7 reaches the retarded-side limit closing timing when feeding EGR gas into a combustion chamber 5 (solid lines in the figure) is lower than the engine load $L_2$ where the closing timing of the intake valve 7 reaches the retarded-side limit closing timing when not feeding EGR gas into a combustion chamber 5 (broken lines in the figure). This reason is as follows.

The limit value of the total amount of intake gas (gas including both air and EGR gas) able to be controlled by the closing timing of the intake valve 7 is constant without regard as to the introduction of EGR gas. When not introducing EGR gas, the intake gas is all air (fresh air), so the air able to be controlled by the closing timing of the intake valve 7 matches the limit value of the total amount of intake gas. On the other hand, when introducing EGR gas, part of the intake gas is EGR gas, so the amount of the air able to be controlled by the closing timing of the intake valve 7 (fresh air) becomes smaller than the limit value of the total amount of intake gas. For this reason, the engine load where the closing timing of the intake valve 7 reaches the retarded-side limit timing becomes lower in the case of feeding EGR gas to the inside of a combustion chamber 5, compared with the case of not feeding EGR gas into a combustion chamber 5.

As will be understood from the solid line of FIG. 9, in the load operating region with a load higher than the engine load $L_3$ when the closing timing of the intake valve 7 reaches the retarded-side limit closing timing, the pressure inside the intake pipe is held at substantially the atmospheric pressure, so in this region, the pumping loss is made substantially zero. Therefore, compared with when not feeding EGR gas into a combustion chamber 5, when feeding it, the region where no pumping loss occurs becomes broader and therefore the fuel consumption can be improved.

When the closing timing of the intake valve 7 reaches the retarded-side limit closing timing, in the low load operating region of a load lower than the engine load $L_3$ at this time, the closing timing of the intake valve 7 is held at the retarded-side limit closing timing.

Further, in the example shown by the solid line in FIG. 9, as the engine load becomes lower from the engine high load operating state, the mechanical compression ratio is made to increase. When the engine load falls to $L_3$, the mechanical compression ratio reaches the maximum mechanical compression ratio. In the low load operating region of a load lower than the engine load $L_3$ when the mechanical compression ratio reaches the maximum mechanical compression ratio, the mechanical compression ratio is held at the maximum mechanical compression ratio. This maximum mechanical compression ratio is set so that the actual compression ratio in the low load operating region of a load lower than the engine load $L_3$ when the closing timing of the intake valve 7 reaches the retarded-side limit closing timing becomes substantially the same as the actual compression ratio in the load operating region of a load higher than the engine load $L_3$. For example, the actual compression ratio in the load low operating region of a load lower than the engine load $L_3$ is made within a range of about ±10 percent of the actual compression ratio in a load operating region of a load higher than the engine load $L_3$, preferably within a range of ±5 percent.

On the other hand, if the closing timing of the intake valve 7 is held at the retarded-side limit closing timing, the change of the closing timing of the intake valve 7 can no longer be used to control the amount of intake air. In the example shown by the solid line in FIG. 9, at this time, that is, in the low load operating region of a load lower than the engine load $L_3$ when the closing timing of the intake valve 7 reaches the retarded-side limit closing timing, the throttle valve 17 is used to control the amount of intake air fed into a combustion chamber 5. However, if the amount of intake air is controlled by the throttle valve 17, the pumping loss increases as shown by the solid line in FIG. 9.

Further, in this embodiment of the present invention, even in the low load operating region of a load lower than the engine load $L_3$ when the closing timing of the intake valve 7 reaches the retarded-side limit closing timing, the EGR rate is held substantially constant and the held EGR rate is made substantially the same as the EGR rate in the load operating region of a load higher than the engine load $L_3$. For example, the EGR rate in the low load operating region of a load lower than the engine load $L_3$ is made within a range of about ±10 percent of the EGR rate in the load operating region of a load higher than the engine load $L_3$, preferably within a range of ±5 percent.

As explained above, in this embodiment of the present invention, in the almost entire region of the engine load, when feeding the EGR gas into a combustion chamber 5 (solid line in FIG. 9), compared with when not feeding the EGR gas into a combustion chamber 5 (broken line in FIG. 9), the actual compression ratio is made higher and, as a result, the theoretical heat efficiency is made higher.

That is, if feeding the EGR gas into a combustion chamber 5, the air-fuel mixture in the combustion chamber 5 becomes harder to self ignite, so the occurrence of knocking is suppressed (knocking resistance becomes higher). For this reason, when feeding the EGR gas into a combustion chamber 5, compared with when not feeding EGR gas into a combustion chamber 5, knocking will not occur even if raising the actual compression ratio. Therefore, in this embodiment of the present invention, when feeding EGR gas into a combustion chamber 5, compared with when not feeding EGR gas into a combustion chamber 5, the actual compression ratio is raised. Further, as will be understood from FIG. 7, if raising the actual compression ratio, the theoretical heat efficiency is raised.

In particular, in the low load operating region of a load lower than the engine load $L_3$ when the closing timing of the intake valve 7 reaches the retarded-side limit closing timing, it is not possible to retard the closing timing of the intake valve 7 more. For this reason, in this embodiment of the present invention, when feeding EGR gas into a combustion chamber 5, compared with when not feeding EGR gas into a combustion chamber 5, the mechanical compression ratio is raised to raise the actual compression ratio.

Here, as will be understood from FIG. 7, it is also possible to raise the actual compression ratio so as to raise the heat efficiency, but it is also possible to raise the mechanical compression ratio (that is, expansion ratio) so as to raise the heat efficiency. Therefore, according to this embodiment of the present invention, in the low load operating region of a load lower than the engine load $L_3$ when the closing timing of the intake valve 7 reaches the retarded-side closing timing, in addition to raising the actual compression ratio, the mechanical compression ratio (that is, expansion ratio) is raised, so it is possible to make the heat efficiency extremely high.

Further, in the region ($L_3$-$L_2$) of a load higher than the engine load $L_3$ when the closing timing of the intake valve 7 reaches the retarded-side limit closing timing and a load lower than the engine load $L_2$ when the closing timing of the intake valve 7 reaches the advanced-side limit closing timing, when feeding EGR gas into a combustion chamber 5 (solid line in FIG. 9), compared with when not feeding EGR gas into a combustion chamber 5 (broken line in FIG. 9), the closing timing of the intake valve 7 is advanced and the mechanical compression ratio is raised to raise the actual compression ratio. Due to this, even in this region, in addition to raising the actual compression ratio, the mechanical compression ratio is raised, so the heat efficiency can be made high.

Note that, in the example shown by the solid line in FIG. 9, in the load operating region of a load lower than the engine load $L_2$ when the closing timing of the intake valve 7 reaches the advanced-side limit closing timing, the EGR rate is held substantially constant. However, if advancing the closing timing of the intake valve 7, the air flow occurring in a combustion chamber 5 becomes larger, so the air-fuel mixture in the combustion chamber 5 becomes easier to burn. For this reason, even if the amount of EGR gas fed into a combustion chamber 5 becomes greater, an increase in the torque fluctuation is suppressed. For this reason, in the region ($L_3$-$L_2$) of a load higher than the engine load $L_3$ when the closing timing of the intake valve 7 reaches the retarded-side limit closing timing and a load lower than the engine load $L_2$ when the closing timing of the intake valve 7 reaches the advanced-side limit closing timing, that is, in the region where as the engine load becomes higher, the closing timing of the intake valve 7 is advanced, it is also possible to raise the EGR rate along with an increase of the engine load (that is, along with the advance of the closing timing of the intake valve 7). In this case, the actual compression ratio is made higher along with the EGR rate becoming higher.

Further, the set EGR rate is made to change in accordance with operating parameters other than the engine load. In other words, even if the engine load is the same, the set EGR rate is made to change in accordance with operating parameters other than the engine load. For example, when the engine speed is high, the flow rate of the intake gas is fast, the air-fuel mixture in a combustion chamber 5 is easily disturbed, and thus the mixture is easily burned, so the set EGR rate is made higher. Further, when the engine cooling water is low in temperature, that is, at the time of cold startup of the internal combustion engine, the air-fuel mixture becomes hard to burn. Therefore, if the EGR rate is high at this time, misfire incurs. As a result, the set EGR rate is lowered.

In this way, when the set EGR rate is changed in accordance with parameters other than the engine load, the actual compression ratio is also made to change in accordance with the change of the set EGR rate.

Figure 10:
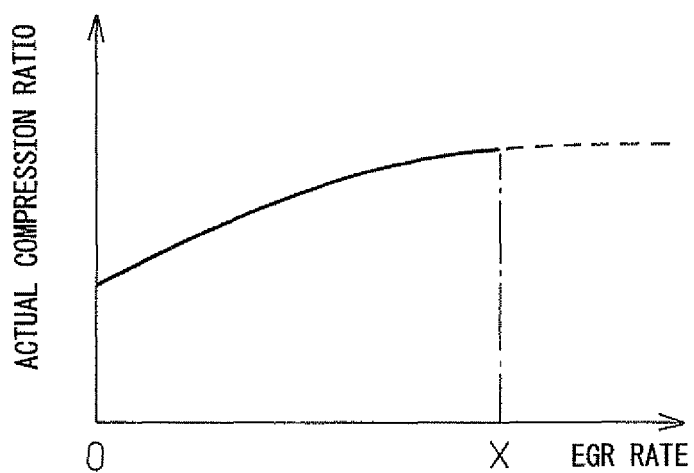
FIG. 10 is a view showing the relationship between an EGR rate and an actual compression ratio.

FIG. 10 is a view showing the relationship between the EGR rate and the actual compression ratio. As shown in FIG. 10, the actual compression ratio is raised the higher the EGR rate. This is because the higher the EGR rate, knocking becomes harder to occur even if raising the actual compression ratio. However, if the EGR rate becomes too high, the combustion of the air-fuel mixture in a combustion chamber 5 becomes unstable and torque fluctuation etc. ends up being incurred. For this reason, the set EGR rate is set within a range of a certain constant EGR rate X or less based on the engine load or the engine speed etc.

Note that, the one-dot chain lines in FIG. 9 express the changes in parameters in the case where the set EGR rate is relatively low. As will be understood from the figure, when the set EGR rate is relatively low, compared with when the set EGR rate is high (solid lines in the figure), the actual compression ratio is made lower. Further, the engine load where the EGR rate reaches the set EGR rate when the set EGR rate is low is higher than the engine load $L_2$ where the EGR rate reaches the set EGR rate when the set EGR rate is high. Further, the engine load where the closing timing of the intake valve 7 reaches the retarded-side limit closing timing when the set EGR rate is low is higher than the engine load $L_3$ where the closing timing of the intake valve 7 reaches the retarded-side limit closing timing when the set EGR rate is high.

Furthermore, in the example shown in FIG. 9, in the region ($L_3$-$L_2$) of a load higher than the engine load $L_3$ when the closing timing of the intake valve 7 reaches the retarded-side limit closing timing and a load lower than the engine load $L_2$ when the closing timing of the intake valve 7 reaches the advanced-side limit closing timing, the EGR rate is set based on the engine operating state, the actual compression ratio is calculated based on the set EGR rate, and the mechanical compression ratio is controlled to give this actual compression ratio. That is, in the example shown in FIG. 9, the mechanical compression ratio is made to change in accordance with the engine operating state.

As opposed to this, in this region, it is also possible to control the mechanical compression ratio based only on the engine load. This state is shown in FIG. 11.

Figure 11:
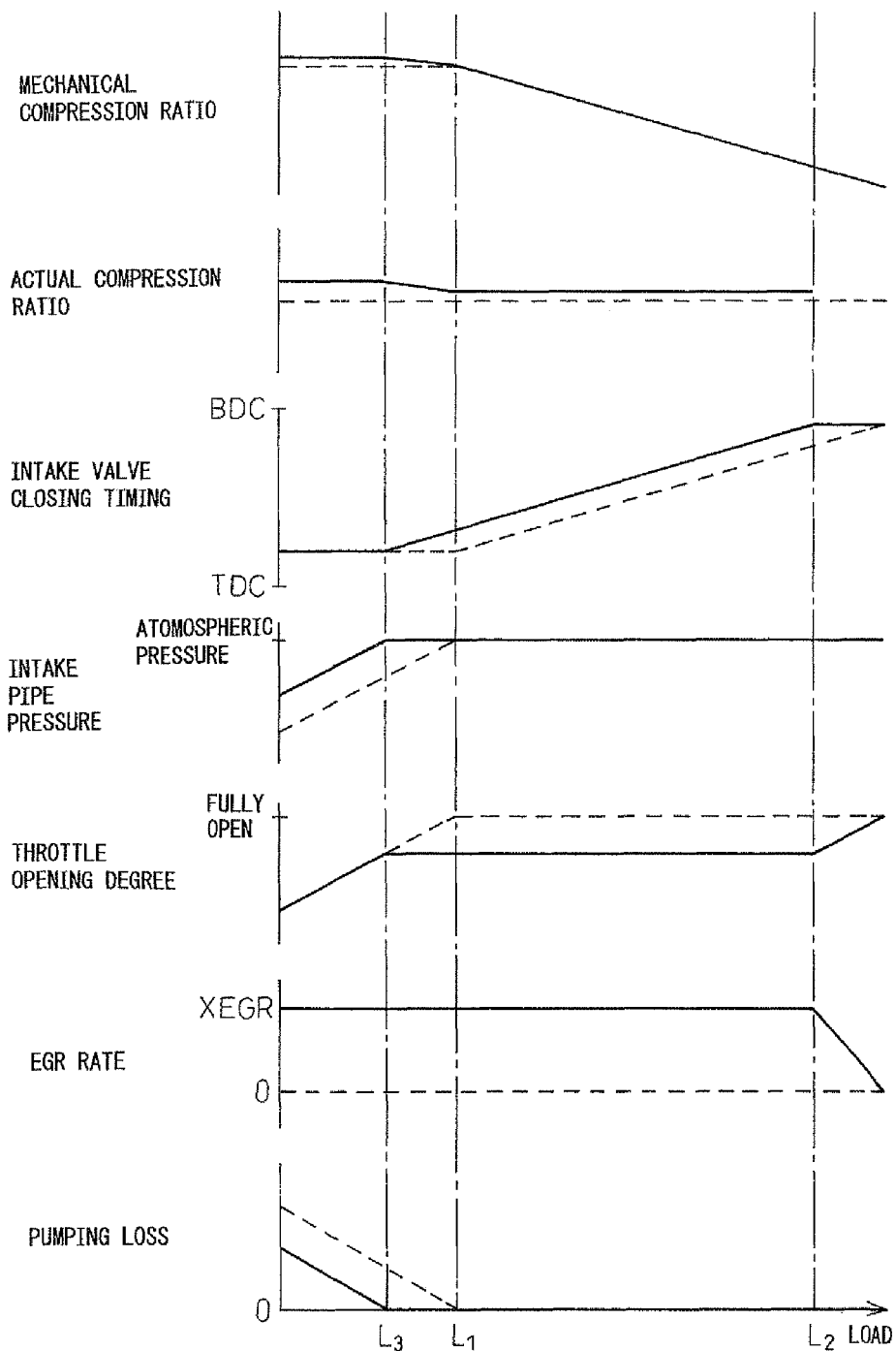
FIG. 11 is a view showing changes in the mechanical compression ratio etc. according to the engine load.

FIG. 11 shows the changes in parameters, such as the mechanical compression ratio, actual compression ratio, closing timing of the intake valve 7, pressure inside the intake pipe, opening degree of the throttle valve 17, and EGR rate, in accordance with the engine load at a certain engine speed and is a view similar to FIG. 9. In the example shown by the solid lines in FIG. 11, in the region of an engine load from $L_1$ to $L_2$, both when feeding EGR gas into a combustion chamber 5 (solid line in the figure) and when not feeding it (broken line in the figure), the mechanical compression ratio is similarly controlled in accordance with the engine load. That is, in the example shown by the solid lines in FIG. 11, the mechanical compression ratio is controlled based on only the engine load. By controlling the mechanical compression ratio in this way, it is possible to facilitate control of the mechanical compression ratio compared with the case shown in FIG. 9.

Note that, in this case, in the region of an engine load from $L_1$ to $L_2$, when feeding EGR gas into a combustion chamber 5 (solid lines in FIG. 11), compared with when not feeding EGR gas into a combustion chamber 5 (broken lines in FIG. 11), the actual compression ratio is raised not by raising the mechanical compression ratio, but by advancing the closing timing of the intake valve 7.

Figure 12:
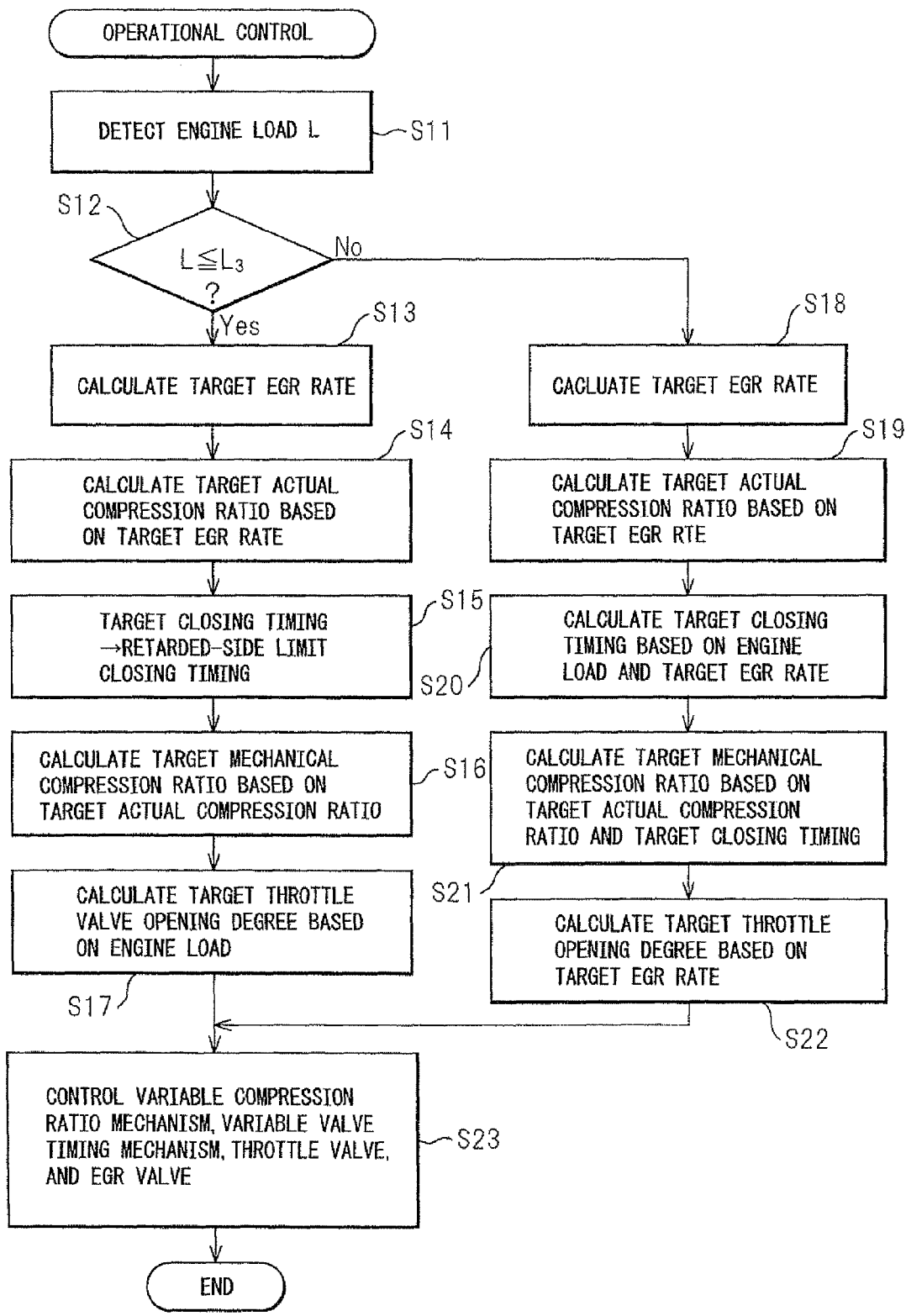
FIG. 12 is a flow chart showing a control routine for operational control of a spark ignition type internal combustion engine.

FIG. 12 is a flowchart showing a control routine of operational control of a spark ignition type internal combustion engine of an embodiment of the present invention. Referring to FIG. 12, first, at step S11, the engine load L is detected based on the output of the load sensor 41. Next, at step S12, it is determined if the engine load L detected at step S11 is not higher than the load $L_3$ at which the closing timing of the intake valve 7 reaches the retarded-side limit closing timing.

When it is determined at step S12 that the engine load L is the load $L_3$ or less, the routine proceeds to step S13. At step S13, the target EGR rate is calculated based on the operating parameters of the internal combustion engine (engine speed, engine cooling water, etc.) As an operating parameter when calculating the target EGR rate, the engine load may also be used.

Next, at step S14, the target EGR rate calculated at step S13 is used as the basis to calculate the target actual compression ratio using the map such as shown in FIG. 10. Next, at step S15, the target closing timing of the intake valve 7 is set at the retarded-side limit closing timing. At step S16, the target mechanical compression ratio is calculated so that the actual compression ratio becomes the target actual compression ratio calculated at step S14 when the closing timing of the intake valve 7 is the retarded-side limit closing timing. Next, at step S17, the target throttle opening degree is calculated so that the amount of intake air fed into a combustion chamber 5 becomes an amount of intake air in accordance with the engine load.

On the other hand, when it is determined at step S12 that the engine load L is higher than the load $L_3$ where the closing timing of the intake valve 7 reaches the retarded-side limit closing timing, the routine proceeds to step S18. At step S18, the target EGR rate is calculated in the same way as step S13. Next, at step S19, the target EGR rate calculated at step S18 is used as the basis to calculate the target actual compression ratio using a map such as shown in FIG. 10. Next, at step S20, based on the engine load and target EGR rate, the target closing timing of the intake valve 7 is calculated so that the amount of intake air (amount of fresh air) fed into a combustion chamber 5 becomes an amount of intake air in accordance with the engine load. At step S21, the target mechanical compression ratio is calculated so that the actual compression ratio becomes the target actual compression ratio calculated at step S19 when the closing timing of the intake valve 7 is the target closing timing of the intake valve 7 calculated at step S20. Next, at step S22, the target EGR rate calculated at step S18 is used as the basis to calculate the target throttle valve opening degree so that the pressure inside the intake pipe becomes the atmospheric pressure.

At step S23, the variable compression ratio mechanism A is controlled so that the mechanical compression ratio becomes the target mechanical compression ratio calculated at step S16 or S21, while the variable valve timing mechanism is controlled so that the closing timing of the intake valve 7 becomes the target closing timing calculated at step S15 or S20. Further, the throttle valve 17 is controlled so that the opening degree of the throttle valve 17 becomes the target throttle opening degree calculated at step S17 or S22, the EGR control valve 24 is controlled so that the EGR rate becomes the target EGR rate calculated at step S13 or S18, and the control routine is ended.

Note that, the present invention was explained in detail based on specific embodiments, but a person skilled in the art could make various changes, corrections, etc. without departing from the scope of the claims and idea of the present invention.

REFERENCE SIGNS LIST

1 . . . crank case
2 . . . cylinder block
3 . . . cylinder head
4 . . . piston
5 . . . combustion chamber
7 . . . intake valve
23 . . . EGR passage
24 . . . EGR control valve
25 . . . EGR cooling device
A . . . variable compression ratio mechanism
B . . . variable valve timing mechanism

The invention claimed is:

1. A spark ignition-type internal combustion engine comprising: a variable compression ratio mechanism able to change a mechanical compression ratio; a variable valve timing mechanism able to control a closing timing of an intake valve; an EGR mechanism that feeds part of the exhaust gas through an EGR passage as EGR gas to the inside of a combustion chamber at an EGR rate; and an electronic control unit that is configured such that: at the time of engine low load operation, the mechanical compression ratio is made higher compared with the mechanical compression ratio at the time of engine high load operation; the higher the EGR rate, the higher an actual compression ratio is made; when the engine load is higher than the engine load at which the closing timing of the intake valve reaches a retarded-side limit closing timing, and is lower than the engine load at which the EGR rate reaches the set EGR rate, an actual compression ratio is increasing by advancing a closing timing of the intake valve; and when the engine load is lower than the engine load at which the closing timing of the intake valve reaches the retarded-side limit closing timing, the actual compression ratio is raised only by increasing the mechanical compression ratio.

2. A spark ignition type internal combustion engine as set forth in claim 1, wherein when the engine load is higher than the engine load at which the closing timing of the intake valve reaches a retarded-side limit closing timing, and is lower than the engine load at which the EGR rate reaches the set EGR rate, the actual compression ratio is raised by increasing the mechanical compression ratio in addition to advancing the closing timing of the intake valve.

3. A spark ignition type internal combustion engine as set forth in claim 1, wherein when the engine load is higher than the engine load at which the closing timing of the intake valve reaches the retarded-side limit closing timing, the EGR mechanism is used to feed EGR gas into a combustion chamber.

4. A spark ignition-type internal combustion engine as set forth in claim 1, wherein when the engine load is lower than the engine load at which the EGR rate reaches the set EGR rate, the closing timing of the intake valve is advanced up to an advanced-side limit closing timing along with the engine load becoming higher.

5. A spark ignition-type internal combustion engine as set forth in claim 4, wherein when the engine load is lower than the engine load at which the EGR rate reaches the set EGR rate, in the region of a load lower than the engine load when the closing timing of the intake valve reaches an advanced-side limit closing timing, the amount of intake air fed into a combustion chamber is controlled by changing the closing timing of the intake valve.

6. A spark ignition-type internal combustion engine as set forth in claim 4, wherein when the engine load is lower than the engine load at which the EGR rate reaches the set EGR rate, in the region of a load lower than the engine load when the closing timing of the intake valve reaches the advanced-side limit closing timing, the higher the engine load, the higher the EGR rate is made.

7. A spark ignition-type internal combustion engine as set forth in claim 6, wherein when the engine load is lower than the engine load at which the EGR rate reaches the set EGR rate, in the region of a load lower than the engine load when the closing timing of the intake valve reaches the advanced-side limit closing timing, the higher the engine load, the smaller the opening degree of a throttle valve is made.

8. A spark ignition-type internal combustion engine as set forth in claim 4, wherein when the engine load is lower than the engine load where the EGR rate reaches the set EGR rate, in the region of a load lower than the engine load when the closing timing of the intake valve reaches the advanced-side limit closing timing, the EGR rate is held substantially constant regardless of the engine load.

9. A spark ignition-type internal combustion engine as set forth in claim 8, wherein when the engine load is lower than the engine load where the EGR rate reaches the set EGR rate, in the region of a load lower than the engine load when the closing timing of the intake valve reaches the advanced-side limit closing timing, the opening degree of a throttle valve is held at a substantially constant opening degree more closed than fully open regardless of the engine load.

10. A spark ignition-type internal combustion engine as set forth in claim 8, wherein in the region of a load higher than the engine load when the closing timing of the intake valve reaches the advanced-side limit closing timing, the amount of intake air fed into a combustion chamber is controlled by changing the closing timing of the intake valve.

11. A spark ignition-type internal combustion engine as set forth in claim 4, wherein in the region of a load higher than the engine load when the closing timing of the intake valve reaches the advanced-side limit closing timing, the closing timing of the intake valve is held at the advanced-side limit closing timing.

12. A spark ignition-type internal combustion engine as set forth in claim 11, wherein in the region of a load higher than the engine load when the closing timing of the intake valve reaches the advanced-side limit closing timing, the opening degree of a throttle valve is made larger as the engine load becomes higher.

13. A spark ignition-type internal combustion engine as set forth in claim 1, wherein at the time of engine low load operation, the closing timing of the intake valve is retarded, as the engine load becomes lower, until a retarded-side limit closing timing enabling control of an amount of intake air fed into a combustion chamber.

14. A spark ignition-type internal combustion engine as set forth in claim 13, wherein in the region of a load lower than the engine load when the closing timing of the intake valve reaches the retarded-side limit closing timing, the amount of intake air fed into the combustion chamber is controlled by changing the opening degree of a throttle valve.

15. A spark ignition-type internal combustion engine as set forth in claim 1, wherein at the time of engine low load operation, the mechanical compression ratio is made the maximum mechanical compression ratio.

16. A spark ignition-type internal combustion engine as set forth in claim 1, wherein at the time of engine low load operation, the expansion ratio is made 20 or more.

* * * * *